(12) United States Patent
Rabinovitch et al.

(10) Patent No.: US 9,066,068 B2
(45) Date of Patent: Jun. 23, 2015

(54) INTRA-PREDICTION MODE SELECTION WHILE ENCODING A PICTURE

(75) Inventors: Alexander Rabinovitch, Kfar Yona (IL); Leonid Dubrovin, Karney Shomron (IL); Amichay Amitay, Hod Hasharon (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 397 days.

(21) Appl. No.: 13/285,353

(22) Filed: Oct. 31, 2011

(65) Prior Publication Data

US 2013/0107957 A1  May 2, 2013

(51) Int. Cl.
*H04N 7/32* (2006.01)
*H04N 19/11* (2014.01)
*H04N 19/147* (2014.01)
*H04N 19/176* (2014.01)
*H04N 19/423* (2014.01)
*H04N 19/593* (2014.01)

(52) U.S. Cl.
CPC ... *H04N 19/00042* (2013.01); *H04N 19/00175* (2013.01); *H04N 19/00278* (2013.01); *H04N 19/00484* (2013.01); *H04N 19/00763* (2013.01)

(58) Field of Classification Search
CPC .................................................. H04N 19/00278
USPC ..................................................... 375/240.15
See application file for complete search history.

(56) References Cited

U.S. PATENT DOCUMENTS

| | | | |
|---|---|---|---|
| 6,480,629 B1 | 11/2002 | Bakhmutsky | 382/236 |
| 6,483,876 B1 | 11/2002 | Chang et al. | 375/240.16 |
| 7,929,608 B2 | 4/2011 | Krishnan | 375/240.13 |
| 2006/0176962 A1* | 8/2006 | Arimura et al. | 375/240.24 |
| 2006/0256864 A1 | 11/2006 | Ju | 375/240.12 |
| 2007/0171981 A1* | 7/2007 | Qi | 375/240.24 |
| 2008/0294962 A1* | 11/2008 | Goel | 714/755 |
| 2008/0309769 A1 | 12/2008 | Albu et al. | 348/208.1 |
| 2009/0323810 A1 | 12/2009 | Liu et al. | 375/240.16 |
| 2010/0086032 A1* | 4/2010 | Chen et al. | 375/240.12 |

OTHER PUBLICATIONS

Richardson, Iain E G, "H.264/MPEG-4 Part 10 White Paper", www.vcodex.com, Apr. 30, 2003, pp. 1-6.

* cited by examiner

*Primary Examiner* — Christopher S Kelley
*Assistant Examiner* — Matthew Kwan
(74) *Attorney, Agent, or Firm* — Christopher P. Maiorana, PC (57) ABSTRACT

An apparatus having a memory and a circuit is disclosed. The memory may be configured to store a picture being encoded. The circuit may be configured to calculate a plurality of first arrays directly from a plurality of neighboring samples around a current block of the picture. Each first array generally represents a respective one of a plurality of intra-prediction modes. Each first array may be spatially smaller than the current block. The circuit may also be configured to calculate a second array from a plurality of current samples in the current block. The second array may spatially match the first arrays. The circuit may be further configured to generate a plurality of scores of the intra-prediction modes by comparing the first arrays with the second array and select a given one of the intra-prediction modes corresponding to a lowest of the scores to encode the current block.

16 Claims, 9 Drawing Sheets

FIG. 5 PREDICTION MODE

FIG. 6A VERTICAL (VER)

FIG. 6B HORIZONTAL (HOR)

FIG. 6C DC (DC)

FIG. 6D DIAGONAL DOWN-LEFT (DDL)

FIG. 6E DIAGONAL DOWN-RIGHT (DDR)

FIG. 6F VERTICAL-RIGHT (VR)

FIG. 6G HORIZONTAL-DOWN (HD)

FIG. 6H VERTICAL-LEFT (VL)

FIG. 6I HORIZONTAL-UP (HU)

FIG. 7

INTRA-PREDICTION MODE SELECTION WHILE ENCODING A PICTURE

FIELD OF THE INVENTION

The present invention relates to picture encoding generally and, more particularly, to a method and/or apparatus for implementing a method and system for intra-prediction mode selection while encoding a picture.

BACKGROUND OF THE INVENTION

Intra-prediction is used in advanced video coding standards for efficiently compress frames without using prediction from other frames. The intra-prediction is used as both synchronization points and for new information revealed or occluded in a given frame. The prediction of a block is performed by using the surrounding pixels from neighboring blocks that were previously coded in that frame. The H.264 advanced video coding standard uses 4×4, 8×8, and 16×16 block predictions. In the high efficiency video coding (i.e., HEVC) draft standard, the available block sizes are increased to include 32×32 and 64×64 blocks. Various angular predictions are also examined during intra-prediction. The number of prediction modes varies for the various block sizes. For example, 17 modes are currently defined in HEVC, for the 4×4 blocks, 34 modes for the 8×8 blocks, 34 modes for the 16×16 blocks, 34 modes for the 32×32 blocks and 5 modes for the 64×64 blocks. A typical approach used to select among the intra-prediction modes is to do a direct examination of each mode. Each examination involves creating an appropriate prediction block (for each block currently under consideration) and calculating a sum-of-absolute difference (i.e., SAD) for each mode. The mode with the least cost (i.e., SAD and mode-bits) is selected to intra-code the current block. Checking all possible modes consumes a large amount of computation power and many accesses to memory, which is commonly not well suited to one-dimensional organizations of conventional memories.

It would be desirable to implement a method and system for intra-prediction mode selection while encoding a picture.

SUMMARY OF THE INVENTION

The present invention concerns an apparatus having a memory and a circuit. The memory may be configured to store a picture being encoded. The circuit may be configured to calculate a plurality of first arrays directly from a plurality of neighboring samples around a current block of the picture. Each first array generally represents a respective one of a plurality of intra-prediction modes. Each first array may be spatially smaller than the current block. The circuit may also be configured to calculate a second array from a plurality of current samples in the current block. The second array may spatially match the first arrays. The circuit may be further configured to generate a plurality of scores of the intra-prediction modes by comparing the first arrays with the second array and select a given one of the intra-prediction modes corresponding to a lowest of the scores to encode the current block.

The objects, features and advantages of the present invention include providing a method and/or apparatus for intra-prediction mode selection while encoding a picture that may (i) accelerate intra-prediction mode decision making, (ii) utilize direct calculations from neighboring pixels, (iii) represent prediction blocks with spatially smaller arrays that are easier to calculate, (iv) perform fewer calculations than in common approaches, (v) utilize less circuitry than in common approaches, (vi) consume less power than in common approaches, (vii) provide simple reads and write to and from main memory and/or (viii) be implemented as part of a video encoder.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention describe approaches for accelerating intra-prediction mode decision making. The approaches may be suitable for encoding video using the H.264 advanced video coding (e.g., AVC) standard, the high efficiency video coding (e.g., HEVC) draft standard, similar standards and propriety video encoding techniques. The approaches may also be suitable for encoding still pictures that implement intra-prediction modes. For simplicity, the 4×4 intra-prediction modes of the H.264/AVC standard are generally used as examples; however, other block sizes may be utilized. Benefits from the approaches generally increase as the blocks being encoded become larger. Memory bandwidth savings and computational savings may be realized since a smaller number of comparison operations (e.g., SAD comparisons) may be performed (e.g., 2N SAD operations instead of $N^2$ SAD operation in the common applications).

Figure 1:
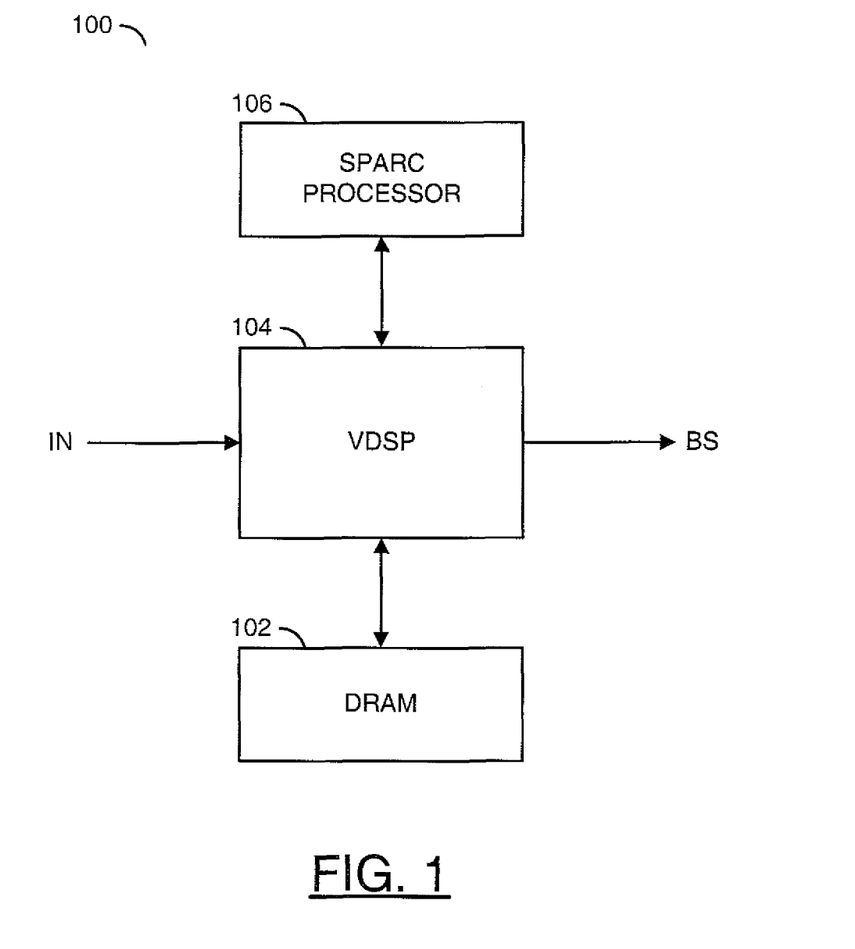
FIG. 1 is a block diagram of an example implementation of an apparatus.

Referring to FIG. 1, a block diagram of an example implementation of an apparatus 100 is shown. The apparatus (or circuit or device or integrated circuit) 100 may implement a video encoder. The apparatus 100 generally comprises a block (or circuit) 102, a block (or circuit) 104 and a block (or circuit) 106. The circuits 102-106 may represent modules and/or blocks that may be implemented as hardware, software, a combination of hardware and software, or other implementations.

The circuit 104 may be directly coupled to the circuit 102 to exchange data and control information. The circuit 104 may be coupled to the circuit 106 to exchange data. An input signal (e.g., IN) may be received by the circuit 104. A bitstream signal (e.g., BS) may be presented by the circuit 104.

The signal IN may be one or more analog video signals and/or one or more digital video signals. The signal IN generally comprises a sequence of progressive-format frames and/or interlace-format fields. The signal IN may include synchronization signals suitable for synchronizing a display with the video information. The signal IN may be received in analog form as, but is not limited to, an RGB (Red, Green, Blue) signal, an EIA-770 (e.g., YCrCb) signal, an S-video signal and/or a Composite Video Baseband Signal (CVBS). In digital form, the signal IN may be received as, but is not limited to, a High Definition Multimedia Interface (HDMI) signal, a Digital Video Interface (DVI) signal and/or a BT.656 signal. The signal IN may be formatted as a standard definition signal or a high definition signal.

The signal BS may be a compressed video signal, generally referred to as a bitstream. The signal BS may comprise a sequence of progressive-format frames and/or interlace-format fields. The signal BS may be compliant with a VC-1, MPEG and/or H.26x standard. The MPEG/H.26x standards generally include MPEG-4 and H.264/AVC. The MPEG standard may be defined by the Moving Pictures Expert Group, International Organization for Standards, Geneva, Switzerland. The H.26x standard may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The circuit 106 may be implemented as a SPARC processor. The circuit 106 may be operational to perform select digital video encoding operations. The encoding may be compatible with the VC-1, MPEG or H.26x standards. The circuit 106 may also be operational to control the circuit 104. Other types of processors may be implemented to meet the criteria of a particular application. The circuit 106 may be fabricated as an integrated circuit on a single chip (or die).

The circuit 104 may be implemented as a video digital signal processor (e.g., VDSP) circuit. The circuit 104 may be operational to perform additional digital video encoding operations. The circuit 104 may be controlled by the circuit 106. The circuit 104 may be fabricated as an integrated circuit on a single chip (or die). In some embodiments, the circuits 106 and 104 may be fabricated on separate chips.

The circuit 102 may be implemented as a dynamic random access memory (e.g., DRAM). The memory 102 may be operational to store or buffer large amounts of information consumed and generated by the encoding operations and the filtering operations of the apparatus 100. As such, the circuit 102 may be referred to as a main memory. The memory 102 may be implemented as a double data rate (e.g., DDR) memory. Other memory technologies may be implemented to meet the criteria of a particular application. The circuit 102 may be fabricated as an integrated circuit on a single chip (or die). In some embodiments, the circuits 102, 104 and 106 may be fabricated on separate chips.

Figure 2:
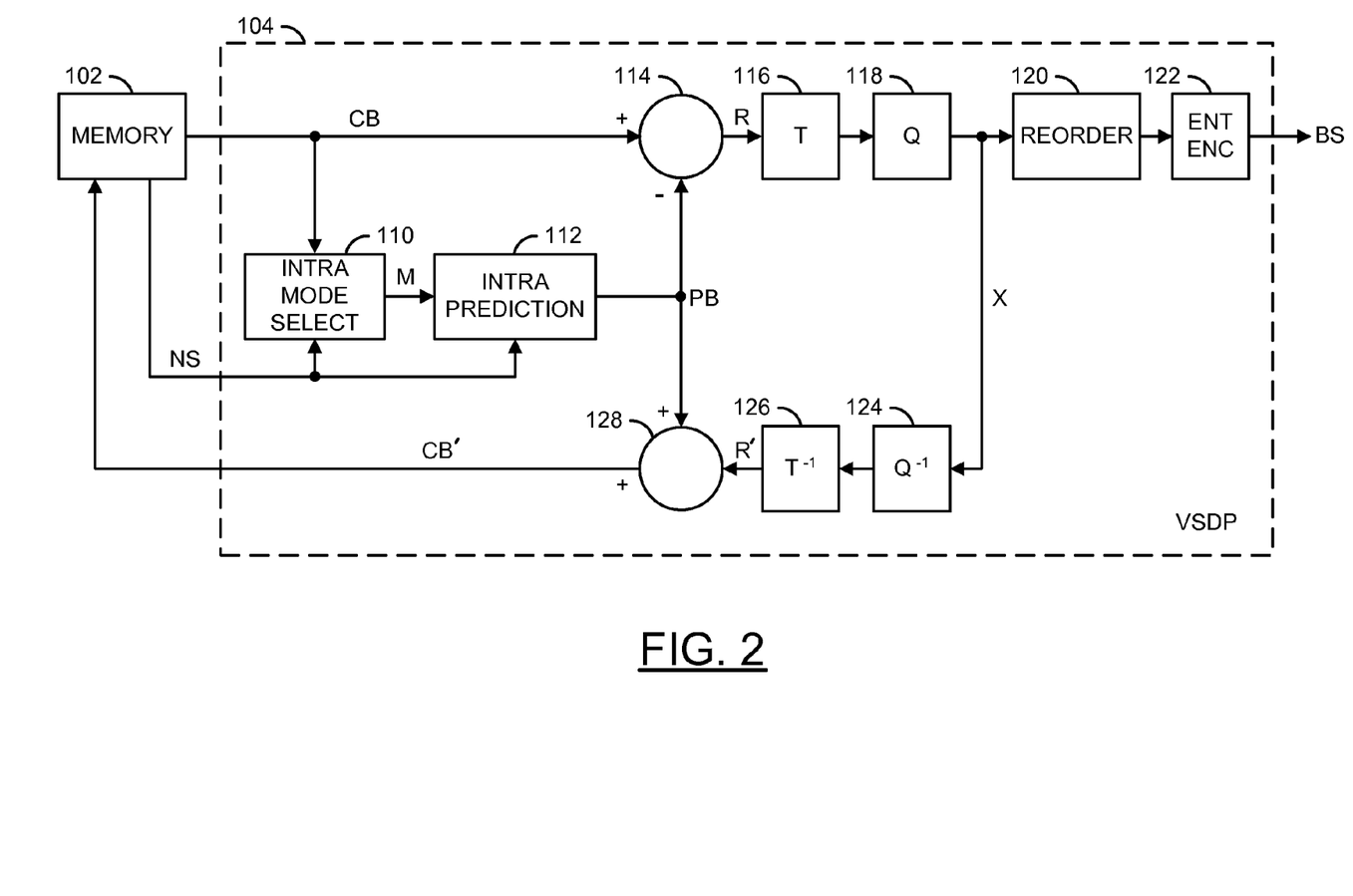
FIG. 2 is a functional block diagram of a portion of a processor circuit.

Referring to FIG. 2, a functional block diagram of a portion of the circuit 104 is shown. The circuit 104 is generally operational to perform a video encoding process (or method) utilizing intra-prediction of some luminance blocks and some chrominance blocks of a picture. The process generally comprises a step (or state) 110, a step (or state) 112, a step (or state) 114, a step (or state) 116, a step (or state) 118, a step (or state) 120, a step (or state) 122, a step (or state) 124, a step (or state) 126 and a step (or state) 128. The steps 110-128 may represent modules and/or blocks that may be implemented as hardware, software, a combination of hardware and software, or other implementations.

The steps 110 and 114 may receive a current block signal (e.g., CB) from the circuit 102. The step 110 may generate a mode signal (e.g., M) that is transferred to the step 112. A prediction block signal (e.g., PB) may be generated by the step 112 and presented to the steps 114 and 128. The step 114 may generate a residual signal (e.g., R) received by the step 116. The step 116 may present information to the step 118. A signal (e.g., X) may be generated by the step 118 and transferred to the steps 120 and 124. The step 120 may present information to the step 122. The step 122 may generate and present the signal BS. The step 124 may transfer information to the step 126. A reconstructed residual signal (e.g., R') may be generated by the step 126 and transferred to the step 128. The step 128 may generate a reconstructed current block signal (e.g., CB') received by the circuit 102. The circuit 102 may also generate a neighboring sample signal (e.g., NS) presented to the steps 110 and 112.

The step 110 may implement an intra mode selection step. The step 110 is generally operational to select a given mode among multiple intra-prediction modes for a current block of a current picture (e.g., frame or field). Each pixel of a picture may be considered to have a luminance (sometimes called "luma" for short) value and two chrominance (sometimes called "chroma" for short) values. The step 110 may be performed without generating actual prediction blocks.

The selection of the given mode may be performed by multiple steps. The steps may include, but are not limited to, the following. Multiple prediction arrays may be calculated directly from the neighboring samples (or elements) around the current block of the picture. The multiple neighboring samples (e.g., luma values or chroma values) from neighboring blocks around the current block may be received via the signal NS. In some cases, some to all of the neighboring samples may be received by the step 110 in the signal CB' instead of the signal NS (e.g., before buffering in the circuit 102). Each prediction array generally represents a corresponding one of several prediction (or synthesized) blocks defined by the encoding standard for a current block size. Each prediction block generally represents a corresponding intra-prediction mode defined by the encoding standard for the current block size. Each prediction array (e.g., 8×1 elements) may also be spatially smaller (e.g., have fewer elements) than the current block (e.g., 4×4 elements). A current array may be calculated from the current samples (or elements) in the current block. The current block may be received in the signal CB. The current array may spatially (and/or dimensionally) match the prediction arrays. Multiple scores of the respective intra-prediction modes may be generated by comparing the prediction arrays with the current array. The given mode of the intra-prediction modes corresponding to a lowest of the scores may be selected as the intra-prediction mode to be used to encode the current block. The given mode may be presented in the signal M to the step 112.

The step 112 may implement an intra prediction step. The step 112 is generally operational to calculate multiple prediction samples of a prediction block for the selected (given) intra-prediction mode based on the neighboring samples. The neighboring samples may be received via the signal NS. In some situations, some to all of the neighboring samples may be received by the step 112 in the signal CB' instead of the signal NS. The calculated (or synthesized) prediction block may be presented to the steps 114 and 128 in the signal PB.

The step 114 may implement a subtraction step. The step 114 is generally operational to calculate residual blocks by subtracting the prediction blocks from the current blocks. The subtractions (or differences) may be calculated on a sample-by-sample basis where each prediction sample in a prediction block is subtracted from a respective current sample in a current block to calculate a respective residual sample (or element) in a residual block. The residual blocks may be presented to the step 116 in the signal R.

The step 116 may implement a transform step. The step 116 is generally operational to transform the residual samples in the residual blocks into transform coefficients. The transform coefficients may be presented to the step 118.

The step 118 may implement a quantization step. The step 118 is generally operational to quantize the transform coefficients received from the step 116. The quantized transform coefficients may be presented in the signal X.

The step 120 may implement a reorder step. The step 120 is generally operational to rearrange the order of the quantized transform coefficients and other symbols and syntax elements for efficient encoding into a bitstream.

The step 122 may implement an entropy encoder step. The step 122 is generally operational to entropy encode the string of reordered symbols and syntax elements. The encoded information may be presented in the signal BS.

The step 124 may implement an inverse quantization step. The step 124 is generally operational to inverse quantize the transform coefficients received in the signal X to calculate reconstructed transform coefficients. The step 124 may reverse the quantization performed by the step 118. The reconstructed transform coefficients may be transferred to the step 126.

The step 126 may implement an inverse transform step. The step 126 is generally operational to inverse transform the reconstructed transform coefficients to calculate reconstructed residual samples. The step 126 may reverse the transform performed by the step 116. The reconstructed residual samples may be presented in the signal R'.

The step 128 may implement an adder step. The step 128 may be operational to add the reconstructed residual samples received via the signal R' to the prediction samples received via the signal PB to generate reconstructed current samples. The reconstructed current samples may be presented in the signal CB' to the circuit 102. In some situations, the reconstructed current samples may also be presented directly to the steps 110 and/or 112.

Figure 3:
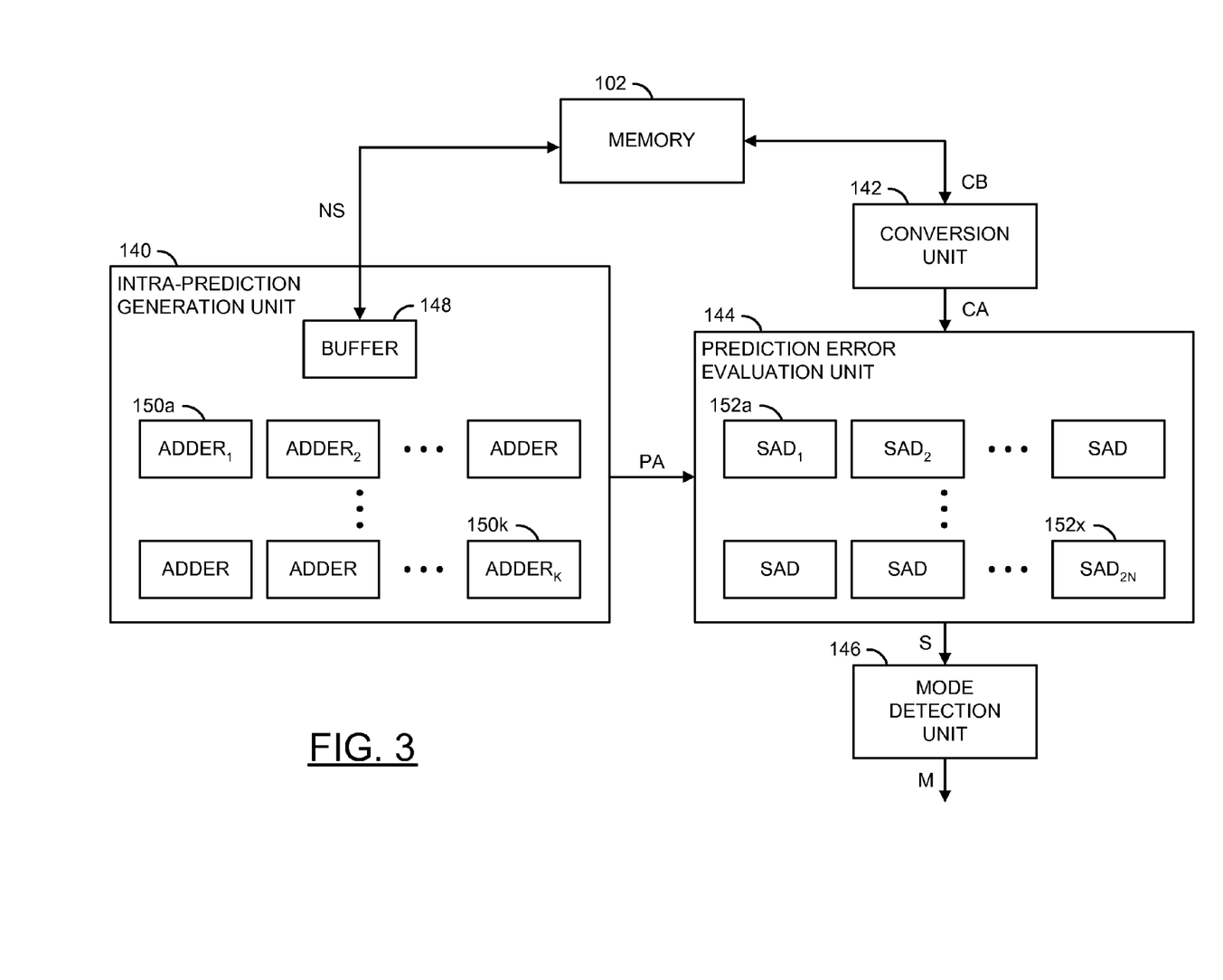
FIG. 3 is a functional block diagram of an example implementation of an intra-prediction mode selection in accordance with a preferred embodiment of the present invention.

Referring to FIG. 3, a functional block diagram of an example implementation of the step 110 is shown in accordance with a preferred embodiment of the present invention. The step 110 may implement a method for intra-prediction mode selection while encoding a picture in a video sequence of pictures. The step 110 generally comprises a step (or state) 140, a step (or state) 142, a step (or state) 144 and a step (or state) 146. The step 140 generally comprises a step (or state) 148 and multiple steps (or states) 150a-150k. The step 144 generally comprises multiple steps (or states) 152a-152x. The steps 148-152x may represent modules and/or blocks that may be implemented as hardware, software, a combination of hardware and software, or other implementations.

The signal NS may be transferred between the step 148 and the circuit 102. A prediction array signal (e.g., PA) may be generated by the step 140 and presented to the step 144. The signal CB may be transferred between the circuit 102 and the step 142. A current array signal (e.g., CA) may be generated by the step 142 and presented to the step 144. The step 144 may generate a score signal (e.g., S) that is transferred to the step 146. The step 146 may generate the signal M.

The step 140 generally implements an intra-prediction generation unit. The step 140 may be operational to generate multiple prediction samples in the prediction arrays based on the neighboring samples received in the signal NS (and/or the signal CB'). A different prediction array may be generated for each respective intra-prediction mode available to encode the current block. Each prediction array generally represents a corresponding prediction block and may be spatially smaller than the prediction blocks. The prediction arrays may be presented to the step 144 in the signal PA.

The step 142 may implement a conversion unit. The step 142 is generally operational to convert (or transform) the current block into a current array representative of the current block. The current array (e.g., J×K array) may be spatially smaller than the current block (e.g., N×M block, where J·K<N·M). The current array may be spatially similar to (match) the prediction arrays. The current array may be presented to the step 144 in the signal CA.

The step 144 may implement a prediction error evaluation unit. The step 144 is generally operational to calculate multiple scores, a different score for each pairing of the current array with a corresponding prediction array. The scores may be presented to the step 146 via the signal S. Each score generally corresponds to a respective intra-prediction mode for the current block size being encoded.

The step 146 may implement a mode detection unit. The step 146 may be operational to find a lowest score among the scores generated by the step 144. The lowest score generally identifies the most efficient (or best) intra-prediction mode in which the current block should be encoded. The selected intra-prediction mode may be identified in the signal M.

The step 148 may implement a buffer step. The step 148 may be operational to buffer the neighboring samples used to calculate the prediction arrays. A size of the buffer may be designed to hold at least all of the neighboring samples (both horizontal neighbors and vertical neighbors) used to calculate the prediction arrays. In some embodiments, the buffer may be sized to hold an entire horizontal row of neighboring samples from a picture plus the vertical neighboring samples. Other buffer sizes may be implemented to meet the criteria of a particular application.

Each step 150a-150k may implement an adder step. The steps may be operational to add values (e.g., luma values or chroma values) of the samples in calculating the elements of the prediction arrays. In some embodiments, the steps 150a-150k may include a bit-shift capability to multiply the values by powers of two. The elements of the prediction arrays may be calculated directly from the neighboring sample values as a linear summation.

Each step 152a-152x may implement a compare step. Each step 152a-152x may be operational to compare an element of the current array received via the signal CA with a corresponding element of a prediction array received via the signal PA. In some embodiments, each comparison may be implemented as an absolute difference comparison between the two elements. A sum of the absolute differences may be used as the score for the comparison of the prediction array against the current array.

Referring to FIGS. 4A-4D, diagrams of example conversions of a block 160 into an array 162 are shown. The conversions may be implemented by the step 142 within the circuit 104. As shown in the examples, the block 160 may be an N×M (e.g., 4×4 illustrated) block having elements 164a-164p. The array 162 may be a J×K array having various number of elements. The block 160 may represent a current block of the current picture. The array 162 may represent a current array generated from the current block by the step 142. In general, the number of elements in the array 162 may be less than the number of elements in the block 160.

Figure 4A:
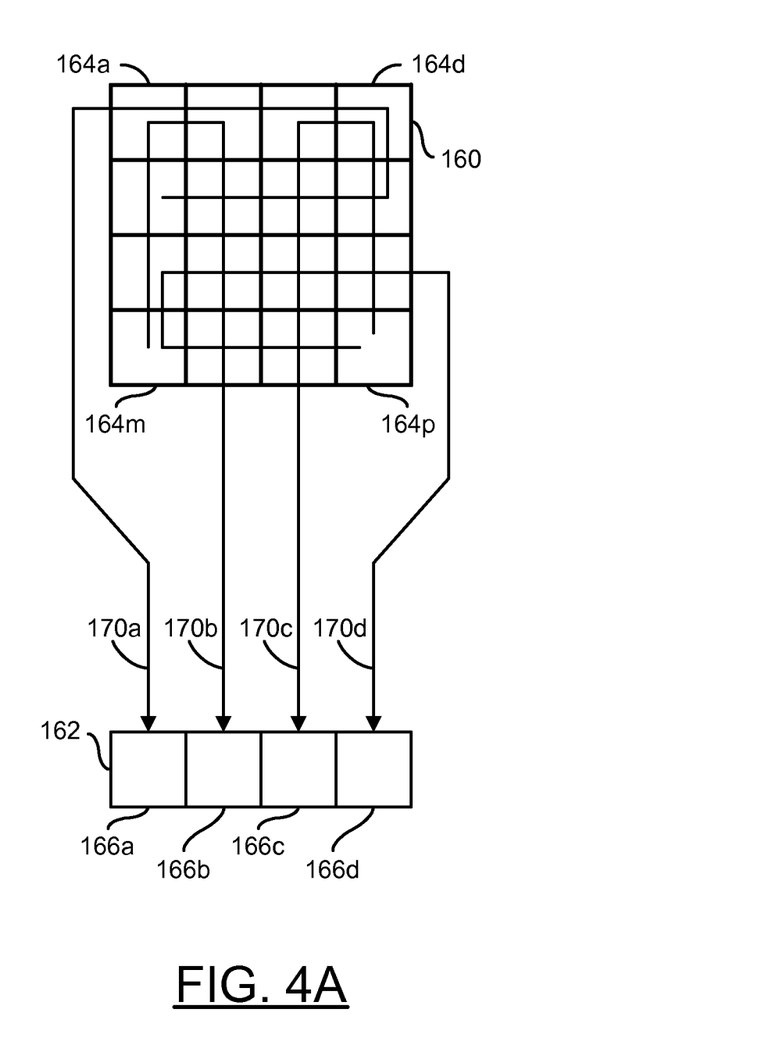
FIGS. 4A-4D are diagrams of example conversions of a block into an array.

Referring to FIG. 4A, a diagram of example paths 170a-170d used to convert the block 160 into the array 162 is shown. Each path 170a-170d may represent a summation of the element values along the path. The summation may be stored as an element in the array 162. For example, the paths 170a-170d may be used to calculate the values in the elements 166a-166d, respectively. The path 170a may create a summation of the elements 164e, 164f, 164g, 164h, 164d, 164c, 164b and 164*a*. The path 170*b* may create a summation of the elements 164*m*, 164*i*, 164*e*, 164*a*, 164*b*, 164*f*, 164*a* and 164*a*. Similar summations may be created along the paths 170*a* and 170*a*. The paths 170*a*-170*d* may include horizontal and vertical components. The paths 170*a*-170*d* may include repeated use of some or all of the elements 164*a*-164*p*.

Figure 4B:
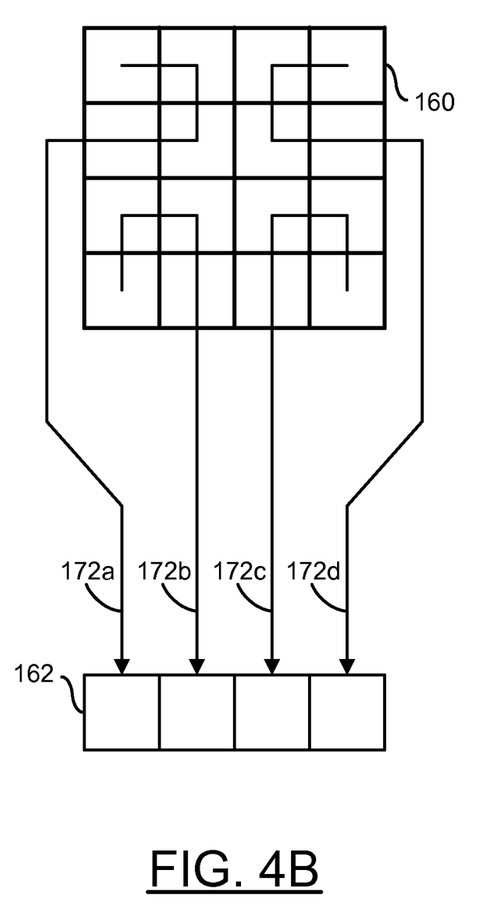
Figure 4C:
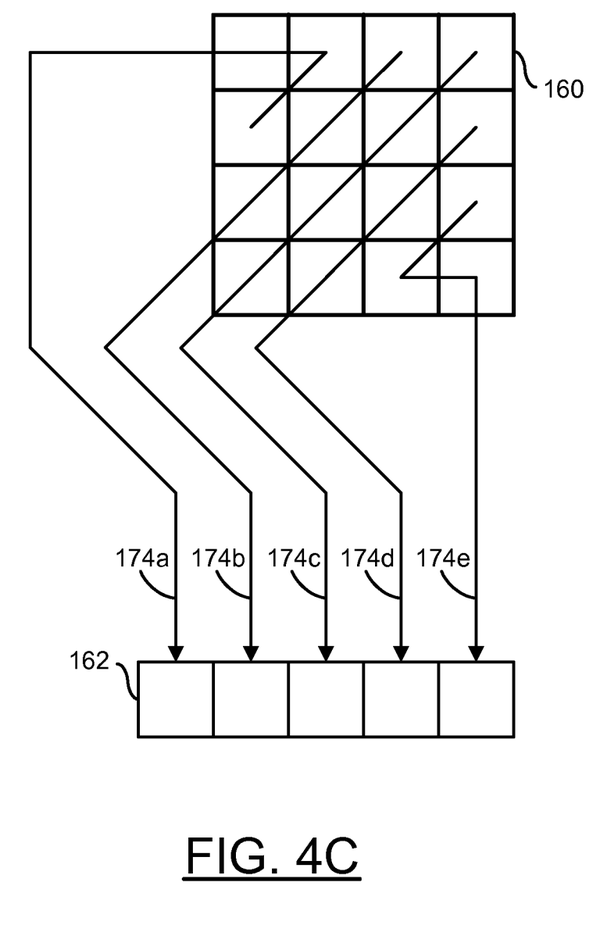
Figure 4D:
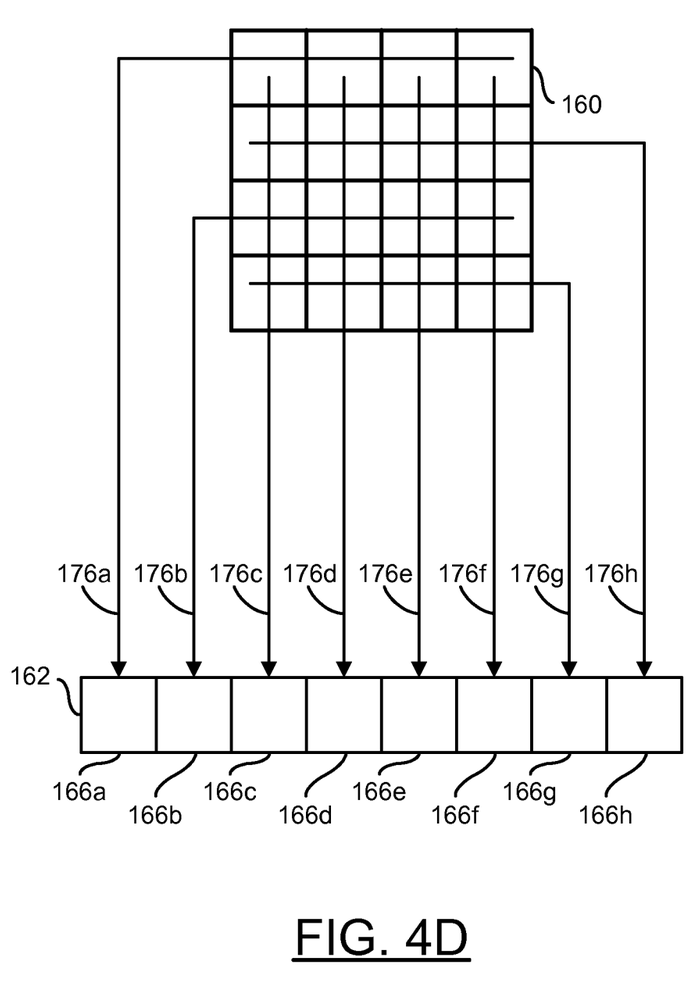

Referring to FIGS. 4B-4D, diagrams of other paths used to convert the block 160 into the array 162 are shown. The paths may be non-crossing (e.g., FIG. 4B paths 152*a*-170*d*) and/or may include angled components (e.g., FIG. 4A paths 170*a*-174*e*). Other routes of the paths may be implemented to meet the criteria of a particular application. The number of paths, and thus the number of elements within the array 162, may also vary to meet the criteria of a particular application. For example, FIGS. 4A and 4B generally show a conversion from an N×N (e.g., 4×4) block 160 to a N×1 (e.g., 4×1) array 162. FIG. 4A illustrates a conversion from an N×N (e.g., 4×4) block 160 to a J×1 (e.g., 5×1) array 152. FIG. 4B illustrates a conversion from an N×N (e.g., 4×4) block 160 to a 2N×1 (e.g., 8×1) array 162 (e.g., paths 176*a*-176*h*). Other mappings between the block 160 and the array 162 (e.g., an integral projection mapping) may be implemented to meet the criteria of a particular application.

Returning to FIG. 2, once the best mode has been selected, the step 112 may be used to calculate each predicted sample of a predicted block for the best mode. The predicted block may be presented in the signal PB to the steps 114 and 128.

Figure 5:
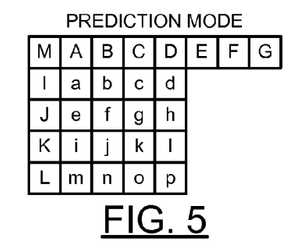
FIG. 5 is a diagram of an example labeling of samples in and around a prediction block.

Referring to FIG. 5, a diagram of an example labeling of samples in and around a prediction block is shown. The labels are generally compliant with the H.264/AVC standard. Each square may present a single sample (e.g., pixel, luma value or chroma value) location. The squares a-p may be the prediction sample locations that form the prediction block. The values a-p may represent the prediction sample values. The squares A-M may be the neighboring sample locations. The values A-M may represent the neighboring sample values.

Figure 6A:
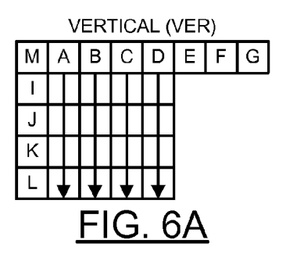
FIGS. 6A-6I are diagrams of a plurality of prediction modes.
Figure 6B:
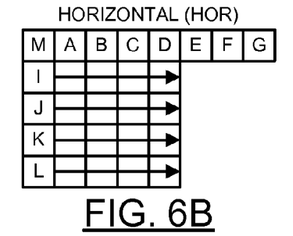
Figure 6C:
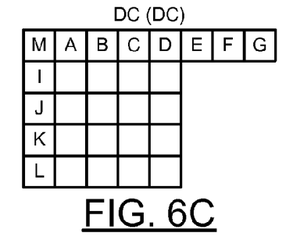
Figure 6D:
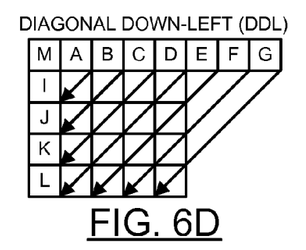
Figure 6E:
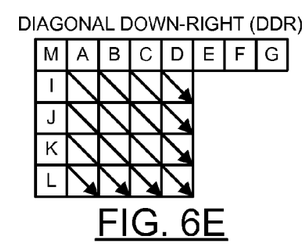
Figure 6F:
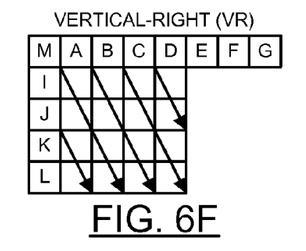
Figure 6G:
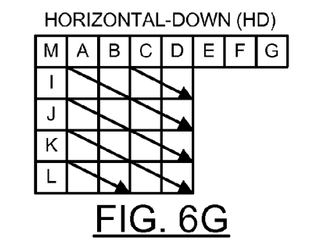
Figure 6H:
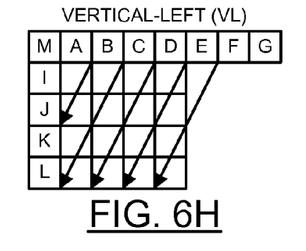
Figure 6I:
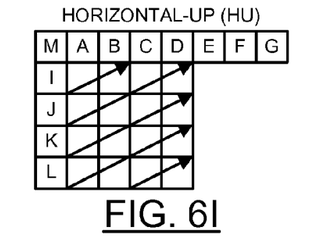

Referring to FIGS. 6A-6I, diagrams of a plurality of conventional prediction modes are shown. The modes are generally compliant with the H.264/AVC standard. The arrows may illustrate which of the neighboring samples A-M may be used to form the prediction samples a-p. For example, consider the diagonal down-left (e.g., DDL) mode illustrated in FIG. 6D. The prediction samples a-p may be created as follows:

$$a=(A+2B+C+2)/4;$$

$$b=e=(B+2C+D+2)/4;$$

$$c=f=i=(C+2D+E+2)/4;$$

$$d=g=j=m=(D+2E+F+2)/4;$$

$$h=k=n=(E+2F+G+2)/4;$$

$$i=o=(F+2G+H+2)/4; \text{ and}$$

$$p=(G+3H+2)/4.$$

Similar equations generally exist for the other modes. Other equations may be defined by the H.264/AVC standard for 8×8 and 16×16 prediction blocks. Other prediction modes, other block sizes and other equations may be implemented to meet the criteria of a particular application.

Figure 7:
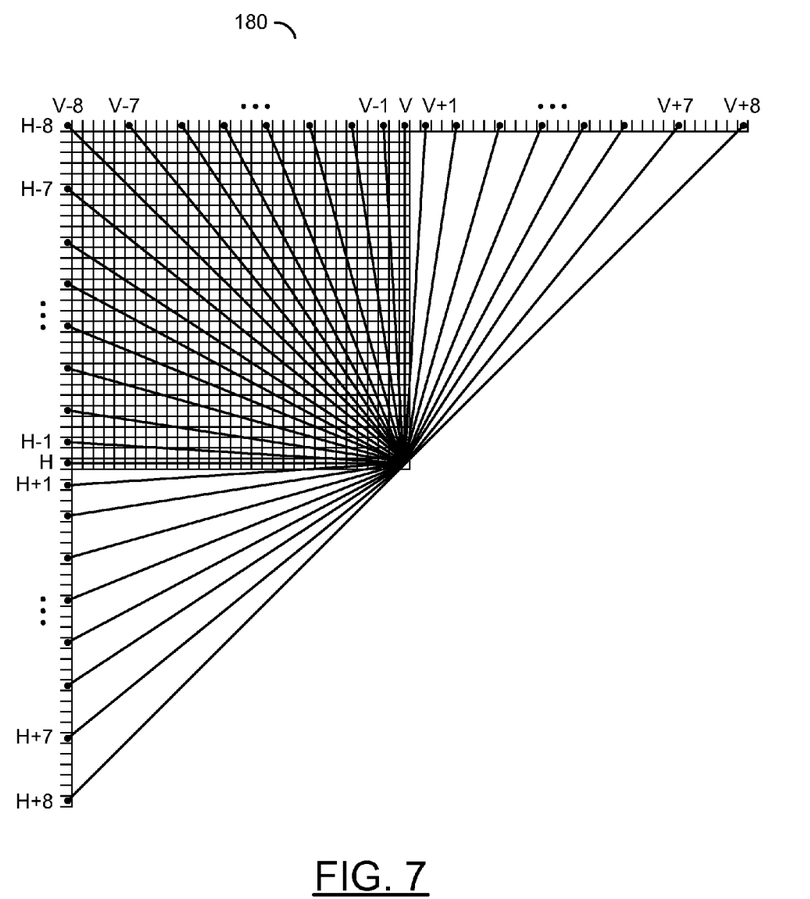
FIG. 7 is a diagram of an example 32×32 prediction block.

Referring to FIG. 7, a diagram of a conventional 32×32 prediction block 180 is shown. The HEVC draft standard generally establishes multiple (e.g., 33) different angles and a DC (e.g., no angle) by which the prediction block 180 may be created. A 64×64 prediction block may also be created in compliance with the HEVC draft standard.

Returning to FIGS. 3 and 4D, the paths (e.g., 176*a*-176*h*) through the block 160 may be mapped to the adder steps 150*a*-150*k* such that the elements of the prediction arrays may be calculated directly from the neighboring sample values. For example, the path 176*a* sums the elements in four locations (e.g., a, b, c and d) to generate the value of element 166*a*. By applying the H.264/AVC DDL intra-prediction mode (e.g., FIG. 6D) to the path 176*a*, the element 166*a* for the DDL mode may be calculated in the step 140 as:

$$\text{element } 166a=(A+3B+4C+4D+3E+F+8)/4$$

The element 166*c* for the DDL mode may be calculated as:

$$\text{element } 166c=(A+3B+4C+4D+3E+F+8)/4$$

The element 166*f* for the DDL mode may be calculated as:

$$\text{element } 166f=(D+3E+4F+4G+3H+8)/4$$

Similar expressions may be devised for each path through the block 160 to each element in the array 162. To achieve a higher precision for the calculations (e.g., two bytes instead of a single byte), the constants and/or divisions may be eliminated. For example, the element 166*a* may be calculated along the path 176*a* as:

$$\text{element } 166a=A+3B+4C+4D+3E+F$$

Creating the values for the elements in the array 162 may be implemented with the adders 150*a*-150*k* and may be done in accordance with efficient memory accesses to the circuit 102. For example, consider that efficient reads may be reads of 4-bytes and efficient writes may be writes of 4-bytes. For 4×4 neighboring blocks, each 4 consecutive bytes (e.g., each byte representing a neighboring sample) may be read from the circuit 102 to the circuit 104 and buffered (e.g., step 148). Thus, all of the neighboring samples A-M may be transferred from the circuit 102 to the circuit 104 in just four 4-byte accesses. The neighboring samples may be summed along the paths (e.g., paths 176*a*-176*h*) creating the elements of the array 162 (e.g., each element being a byte—or two bytes for higher precision). The elements may subsequently be buffered in registers within the circuit 104 and/or written back to the circuit 102 for temporary storage. Reading and/or writing an 8×1 array 162 of single byte elements to and/or from the circuit 102 may be performed efficiently in as little as two 4-byte accesses.

Some embodiments of the present invention may achieve advantages over the traditional techniques. For example, a lower number of SAD operations 152*a*-152*x* may be implemented in hardware and thus a reduction in area and/or power consumption may be realized when designing a very large scale integrated circuit. Memory bandwidth may also be reduced, which may also reduce the power consumption. Furthermore, memory access may be more fitting to a memory structure, resulting in (i) fewer access cycles for fetching data and (ii) simpler reads. Additional reductions of the calculations may also be achieved since the generation of a hypotheses predictors (e.g., the prediction arrays) may be simpler and utilize fewer operations than the common techniques. Such advantages may be more pronounced for larger blocks, such as the 32×32 and 64×64 blocks of the forming HEVC standard.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory configured to store a picture being encoded; and
a circuit configured to (i) calculate a plurality of first arrays in parallel directly from a plurality of neighboring samples around a current block of said picture, wherein (a) each of said first arrays represents a respective one of a plurality of intra-prediction modes and (b) each of said first arrays is spatially smaller than said current block, (ii) calculate a second array from a plurality of current samples in said current block by adding said current samples along a plurality of paths through said current block, wherein(a) said second array spatially matches said first arrays, (b) each of said first arrays and said second array is one-dimensional and (c) said paths are non-linear paths, (iii) generate a plurality of scores of said intra-prediction modes by comparing said first arrays with said second array and (iv) select a given one of said intra-prediction modes corresponding to a lowest of said scores to encode said current block.

2. The apparatus according to claim 1, wherein said circuit is further configured to calculate a prediction block from said neighboring samples as determined by said given intra-prediction mode.

3. The apparatus according to claim 2, wherein said circuit is further configured to generate a residue block by calculating a difference between said current block and said prediction block.

4. The apparatus according to claim 2, wherein said calculation of said prediction block is compliant with an H.264 advanced video coding standard.

5. The apparatus according to claim 1, wherein (i) said current block comprises $N^2$ elements and (ii) each of said first arrays comprises fewer than 2N elements.

6. The apparatus according to claim 1, wherein said current block is at least a 32×32 block.

7. The apparatus according to claim 1, wherein at least two of said paths overlap each other.

8. The apparatus according to claim 1, wherein said apparatus is implemented as one or more integrated circuits.

9. A method for intra-prediction mode selection while encoding a picture, comprising the steps of:
(A) calculating a plurality of first arrays in parallel directly from a plurality of neighboring samples around a current block of said picture, wherein (i) each of said first arrays represents a respective one of a plurality of intra-prediction modes and (ii) each of said first arrays is spatially smaller than said current block;
(B) calculating a second array from a plurality of current samples in said current block by adding said current samples along a plurality of paths through said current block, wherein (i) said second array spatially matches said first arrays, (ii) each of said first arrays and said second array is one-dimensional and (iii) said paths are non-linear paths;
(C) generating a plurality of scores of said intra-prediction modes by comparing said first arrays with said second array; and
(D) selecting a given one of said intra-prediction modes corresponding to a lowest of said scores to encode said current block.

10. The method according to claim 9, further comprising the step of:

calculating a prediction block from said neighboring samples as determined by said given intra-prediction mode.

11. The method according to claim 10, further comprising the step of:
generating a residue block by calculating a difference between said current block and said prediction block.

12. The method according to claim 10, wherein said calculating of said prediction block is compliant with an H.264 advanced video coding standard.

13. The method according to claim 9, wherein (i) said current block comprises N^2 elements and (ii) each of said first arrays comprises fewer than 2N elements.

14. The method according to claim 9, wherein said current block is at least a 32×32 block.

15. The method according to claim 9, wherein at least two of said paths overlap each other.

16. An apparatus comprising:
means for calculating a plurality of first arrays in parallel directly from a plurality of neighboring samples around a current block of a picture, wherein (i) each of said first arrays represents a respective one of a plurality of intra-prediction modes and (ii) each of said first arrays is spatially smaller than said current block;

means for calculating a second array from a plurality of current samples in said current block by adding said current samples along a plurality of paths through said current block, wherein (i) said second array spatially matches said first arrays, (ii) each of said first arrays and said second array is one-dimensional and (iii) said paths are non-linear paths;

means for generating a plurality of scores of said intra-prediction modes by comparing said first arrays with said second array; and means for selecting a given one of said intra-prediction modes corresponding to a lowest of said scores to encode said current block.

* * * * *